United States Patent
Günther et al.

(10) Patent No.: US 11,378,134 B2
(45) Date of Patent: Jul. 5, 2022

(54) CONSTANT-VELOCITY SLIP BALL JOINT

(71) Applicant: GKN Driveline Deutschland GmbH, Offenbach am Main (DE)

(72) Inventors: Johannes Günther, Seckmauern (DE); Norbert Krancioch, Offenbach (DE)

(73) Assignee: GKN Driveline Deutschland GmbH, Offenbach am Main (DE)

( * ) Notice: Subject to any disclaimer, the term of this patent is extended or adjusted under 35 U.S.C. 154(b) by 354 days.

(21) Appl. No.: 16/623,815

(22) PCT Filed: Jun. 20, 2017

(86) PCT No.: PCT/EP2017/065150
§ 371 (c)(1),
(2) Date: Dec. 18, 2019

(87) PCT Pub. No.: WO2018/233817
PCT Pub. Date: Dec. 27, 2018

(65) Prior Publication Data
US 2020/0116205 A1 Apr. 16, 2020

(51) Int. Cl.
*F16D 3/226* (2006.01)
*F16D 3/227* (2006.01)
*F16D 3/223* (2011.01)

(52) U.S. Cl.
CPC ............. *F16D 3/226* (2013.01); *F16D 3/227* (2013.01); *F16D 2003/22303* (2013.01); *F16D 2003/22309* (2013.01); *Y10S 464/906* (2013.01)

(58) Field of Classification Search
CPC ...................... F16D 3/226; F16D 3/227; F16D 2003/22303; F16D 2003/22309; Y10S 464/906
(Continued)

(56) References Cited

U.S. PATENT DOCUMENTS

| | | | |
|---|---|---|---|
| 3,176,477 A * | 4/1965 | Mazziotti | F16D 3/223 464/144 |
| 5,944,612 A | 8/1999 | Schwarzler | |
| 7,591,730 B2 * | 9/2009 | Schwarzler | F16D 3/224 464/906 |

FOREIGN PATENT DOCUMENTS

| | | |
|---|---|---|
| CN | 1871444 A | 11/2006 |
| CN | 103322076 A | 9/2013 |

(Continued)

OTHER PUBLICATIONS

International Search Report and Written Opinion for PCT/EP2017/065150 dated Mar. 19, 2018 (12 pages; with English translation).

(Continued)

*Primary Examiner* — Greg Binda
(74) *Attorney, Agent, or Firm* — Bejin Bieneman PLC (57) ABSTRACT

A constant-velocity slip ball joint includes an outer joint part with an axis of rotation and outer ball tracks, an inner joint part with inner ball tracks, a plurality of torque-transmitting balls, each guided in associated outer and inner ball tracks, and a cage provided with a plurality of cage windows, which each accommodate each one or more of the balls. The inner joint part can be displaced in relation to the outer joint part by a displacement distance along the axis of rotation. At least a part of the outer ball tracks and at least a part of the inner ball tracks are at a track-helix angle in relation to the axis of rotation. A floor of each ball track, along the displacement path, is spaced apart from the axis of rotation by a respectively constant spacing along a radial direction. A maximum angle of deflection of the inner joint part in relation to the outer joint part is predetermined by an outer contact surface of the cage establishing contact with a first contact surface of the outer joint part and/or by an inner contact surface of the cage establishing contact with a second contact surface of the inner joint part. The cage has (Continued)

a center axis and the inner contact surface is conical. The inner contact surface is at an opening angle of more than 0 degrees in relation to the center axis of the cage.

9 Claims, 6 Drawing Sheets

(58) Field of Classification Search
USPC .................................................. 464/144, 146
See application file for complete search history.

(56) References Cited

FOREIGN PATENT DOCUMENTS

| CN | 105179498 A | 12/2015 |
|---|---|---|
| DE | 19626873 C1 | 12/1997 |
| DE | 102004031154 A1 | 5/2005 |
| DE | 102006020711 A1 | 11/2007 |
| DE | 10 2007 048328 A1 | 7/2008 |
| DE | 202013003111 U1 | 4/2013 |
| JP | H11182571 A | 7/1999 |
| JP | 2003021159 A | 1/2003 |

OTHER PUBLICATIONS

KIPO Official Notice for Filing Response for Application No. KR10-2020-7001577 dated Dec. 7, 2020 (3 pages English translation only).

Notification of Reasons for Rejection from JPO on Application No. JP2019-570539 dated Dec. 8, 2020 (7 pages; with English translation).

Chinese Office Action dated Jun. 23, 2021 for Application No. CN201780094096.4 (13 pages; with English translation).

* cited by examiner

CONSTANT-VELOCITY SLIP BALL JOINT

CROSS-REFERENCE TO RELATED APPLICATIONS

This application is a national stage of, and claims priority to, International Application No. PCT/EP2017/065150, filed on Jun. 20, 2017, which application is hereby incorporated herein by reference in its entirety.

BACKGROUND

Constant-velocity slip ball joints are used, in particular for motor vehicles, in the region of longitudinal-shaft arrangements, but also in side-shaft arrangements. The longitudinal shafts serve to transmit the drive power from a gear mechanism to an axle. In particular here, the gear mechanism is arranged in the front region of a motor vehicle and the longitudinal-shaft arrangement, which extends along the longitudinal axis of the motor vehicle, serves to transmit the drive power from said gear mechanism to a rear axle. Longitudinal-shaft arrangements usually require relatively small angles of deflection, in particular of 0 to 10 degrees, for the joint. The side shafts serve to transmit the drive power from a gear mechanism or differential gear to a wheel, that is to say essentially parallel to an axle of the motor vehicle. Side shafts extend transversely to the longitudinal axis of the motor vehicle. Side shafts usually require relatively large angles of deflection, in particular of 0 to 22 degrees, preferably of 3 to 15 degrees, for the joint, if there are slip joints in the side shaft.

Constant-velocity slip ball joints of the type at issue here comprise an outer joint part with an axis of rotation and outer ball tracks, an inner joint part with inner ball tracks, a plurality of torque-transmitting balls, each guided in associated outer and inner ball tracks, and a cage, which is provided with a plurality of cage windows, which accommodate in each case one or more of the balls. The inner joint part can be displaced in relation to the outer joint part by a displacement distance along the axis of rotation. At least a part of the outer ball tracks and at least a part of the inner ball tracks are at a track-helix angle in relation to the axis of rotation. In particular, a floor (that is to say, in the case of the outer ball tracks, in each case those regions of the ball tracks which are spaced apart most from the axis of rotation; in the case of the inner ball tracks, in each case those regions of the ball tracks which are spaced apart least from a center axis of the inner joint part) of each ball track, along the displacement path, is spaced apart from the axis of rotation by a respectively constant spacing along a radial direction.

In the case of the inner joint part being deflected, the inner joint part is pivoted out of the straightened-out position (axis of rotation of the outer joint part and center axis of the inner joint part are arranged coaxially in relation to one another) into a (differing) deflected position. The axis of rotation of the outer joint part and the center axis of the inner joint part then form an angle of deflection (differing from "0" degrees). A maximum angle of deflection of the inner joint part in relation to the outer joint part is predetermined by an outer contact surface of the cage establishing contact with a first contact surface of the outer joint part and/or by an inner contact surface of the cage establishing contact with a second contact surface of the inner joint part. A constant-velocity slip ball joint can be designed such that a maximum angle of deflection of the inner joint part in relation to the outer joint part is predetermined by an outer contact surface of the cage establishing contact with a first contact surface of the outer joint part, wherein an inner contact surface of the cage does not (quite) establish contact with a second contact surface of the inner joint part. As far as constant-velocity slip ball joints are concerned, in the case of the joint being deflected, the cage is at half the angle of deflection of the inner joint part. The cages here have, on the outside, a—as seen in longitudinal section—conical outer contact surface with a cone angle in relation to the center axis of the cage, and, on the inside, a cylindrical inner contact surface. The inner joint parts have likewise a conical, second contact surface with an angle of inclination in relation to the center axis of the inner joint part. The cone angle of the outer contact surface of the cage and the angle of inclination of the second contact surface of the inner joint part are approximately equal in value and oriented in the same direction. Therefore, the (maximum) achievable angle of deflection of the inner joint part in relation to the outer joint part corresponds to the sum of the cone angle and angle of inclination or double the value of the cone angle (since contact between the inner joint part and cage should preferably be avoided).

Specifically in the field of mass production of motor vehicles, there has been an increase in the requirements which all components have to meet in respect of achievable service life, weight and/or costs. There is therefore also a constant need for joints of this type to be, in view of the aforementioned requirements, developed further.

SUMMARY

The present disclosure is directed to a constant-velocity slip ball joint. The present constant-velocity slip ball joint (also referred to hereinbelow as joint) is used, in particular, in a longitudinal-shaft arrangement for a motor vehicle. It can also be used in all other applications which have hitherto made use of constant-velocity slip ball joints.

Taking this as the departure point, the present disclosure can provide a solution, at least to some extent, to the problems outlined in conjunction with the prior art. The disclosure can provide a constant-velocity slip ball joint which is improved further in respect of fatigue strength.

This is achieved by a constant-velocity slip ball joint according to the features of the claims. Further advantageous embodiments of the disclosure are specified in the dependent claims. The features given individually in the patent claims can be combined with one another in any desired, technically expedient manner and can be supplemented by explanatory facts from the description, with further variants of the disclosure being highlighted.

A contributory constant-velocity slip ball joint here is one having at least one outer joint part with an axis of rotation and with outer ball tracks, having an inner joint part with inner ball tracks, having a plurality of torque-transmitting balls, each guided in associated outer and inner ball tracks, and having a cage, wherein the cage is provided with a plurality of cage windows, which accommodate in each case one or more of the balls. The inner joint part can be displaced in relation to the outer joint part by a displacement distance along the axis of rotation. At least a part of the outer ball tracks and at least a part of the inner ball tracks are at a track-helix angle in relation to the axis of rotation (when the joint is in the straightened-out position). A floor of each ball track, along the displacement path, is spaced apart from the axis of rotation by a respectively constant spacing along a radial direction.

A maximum angle of deflection of the inner joint part in relation to the outer joint part is predetermined by an outer contact surface of the cage establishing contact with a first contact surface of the outer joint part and/or by an inner contact surface of the cage establishing contact (possibly at the same time) with a second contact surface of the inner joint part. The constant-velocity slip ball joint can be designed such that a maximum angle of deflection of the inner joint part in relation to the outer joint part is predetermined by an outer contact surface of the cage establishing contact with a first contact surface of the outer joint part, wherein an inner contact surface of the cage does not (quite) establish contact with a second contact surface of the inner joint part. The cage has a center axis and the inner contact surface of the cage is conical, wherein the inner contact surface is at an opening angle of more than 0 degrees, e.g., more than 1 degree, preferably of more than 4 degrees, in relation to the center axis of the cage.

Reference is made to what has been said above in relation to constant-velocity slip ball joints. The constant-velocity slip ball joint has at least 6 or 6+n (where n is a natural number, i.e., n=1, 2, 3, etc.) balls.

At least individual ones of the outer and/or inner ball tracks run in an inclined state, or at a track-helix angle, in relation to the axis of rotation. This means that the balls move along the ball tracks not just in the axial direction (parallel) along the axis of rotation, but also (transversely thereto) in the circumferential direction.

According to an example of the constant-velocity slip ball joint, at least a part of the outer ball tracks and at least a part of the inner ball tracks are at a track-helix angle in relation to the axis of rotation. Such a track-helix angle assists the control properties of the joint in relation to the balls, and this therefore defines the position of the latter in the axial direction at all points in time during operation of the constant-velocity slip ball joint. At least one pair of tracks, comprising an outer ball track and an inner ball track, with a ball arranged therebetween, is designed with track-helix angles oriented in different directions, and therefore the outer ball track crosses over the inner ball track.

Accordingly, the inner contact surface of the cage, rather than being designed cylindrically (that is to say parallel to the center axis of the cage), is conical. This signifies a retraction of the cage edges in the region of the end sides of the cage, and it is therefore possible for the cage to be deflected to a more pronounced extent in relation to the inner joint part and/or for an angle of inclination of the second contact surface of the inner joint part to be reduced. It is thus the case that the (approximately half) angle of deflection, which was realized previously only by the conical, second contact surface of the inner joint part, is now formed both by the second contact surface and by the conical, inner contact surface. The opening angle and the angle of inclination together form (e.g., at most) half the angle of deflection or are smaller than half the angle of deflection (predetermined, by the cone angle). The kinematics of the constant-velocity slip ball joint are maintained here. In the case of the inner joint part being deflected in relation to the outer joint part by an angle of deflection, it is also the case that the cage, with the center axis, pivots in relation to the axis of rotation by half the angle of deflection.

A cone angle of the outer contact surface of the cage here corresponds to half the angle of deflection. It can be the case that the maximum angle of deflection of the constant-velocity slip ball joint is determined via the cone angle. For this purpose, the cone angle is larger than the sum of the opening angle and angle of inclination.

The cone angle can be at most 20% larger or smaller, but preferably larger, than the sum of the opening angle and angle of inclination.

The resulting reduction in the angle of inclination of the second contact surface of the inner joint part makes it possible to increase the extent of enclosure of the balls in the inner joint part. The extent of the enclosure is the—as seen in the circumferential direction—lateral height (in the radial direction) of the ball tracks in the inner joint part along which the balls are supported during operation of the joint. The increase in the extent of enclosure results in it being possible for the inner joint part to be subjected to higher torques. Furthermore, the fatigue strength is increased, as is therefore the expected service life of the constant-velocity slip ball joint.

For the purpose of increasing the fatigue strength and the predetermined service life, use has regularly been made hitherto of inner joint parts with a larger diameter, higher enclosure of the balls having been possible in this way.

In the case of the inner joint part being deflected in relation to the outer joint part by a predetermined angle of deflection, the center axis of the cage is inclined in relation to the axis of rotation by half the angle of deflection, wherein the second contact surface of the inner joint part is cylindrical or conical in relation to a center axis of the inner joint part and is at an angle of inclination of at least 0 degrees in relation to the center axis of the inner joint part. A sum of the angle of inclination and of the opening angle is (at most) half the maximum angle of deflection.

The conical, inner contact surface of the cage thus makes it possible for the second contact surface of the inner joint part to be cylindrical, the angle of inclination then being 0 degrees. The opening angle then corresponds to (at most) half the maximum angle of deflection; in the case of the joint being arranged in a longitudinal shaft, the opening angle is then up to 5 degrees; in the case of it being arranged in a side shaft, the opening angle is up to 10 degrees.

The opening angle and angle of inclination (with the angle of inclination being greater than 0 degrees), e.g. when the joint is in the straightened-out position, are oriented in different directions, or in opposite directions, in relation to the axis of rotation.

The opening angle and the angle of inclination can have the same value.

The opening angle and the angle of inclination can have different values. It is preferred for the value of the opening angle to be larger than that of the angle of inclination.

It is advantageous if the opening angle of the inner contact surface of the cage is selected to be as large as possible and the angle of inclination of the second contact surface of the inner joint part is selected to be as small as possible, it therefore being possible to maximize the extent of enclosure of the balls in the inner ball tracks of the inner joint part. A ratio of the opening angle to the angle of inclination of at least 2:1 or even at least 4:1, preferably of approximately 5:1, is proposed.

It is proposed that the opening angle should be at least 4 degrees; e.g., at least 8 degrees or at least 12 degrees.

The cage is configured such that the inner contact surface is designed to run all the way around in a circumferential direction.

The inner contact surface is arranged on an inner circumferential surface, and the outer contact surface is arranged on an outer circumferential surface, of the cage, wherein the contact surfaces are each arranged (directly) adjacent to the two end sides of the cage which are oriented along the center axis of the cage, wherein the cage windows are arranged, adjacent to one another in the circumferential direction, between the end sides and the contact surfaces. Chamfers (that is to say beveled or rounded edges) are arranged between the end sides and the contact surfaces, although these chamfers have no effect on the function of the constant-velocity slip ball joint.

As far as the constant-velocity slip ball joint is concerned, the displacement distance is at least 5 millimeters and at most 100 millimeters, e.g., at least 10 millimeters and at most 80 millimeters, or at least 30 millimeters, particularly preferably at most 60 millimeters.

The displacement distance refers to the part of the ball tracks in which the balls can/should be arranged during the envisaged operation of the constant-velocity slip ball joint. The displacement distance here does not cover the so-called end regions of the ball tracks, at which, if balls are arranged there, there is already a limitation to the operation of the constant-velocity slip ball joint. The achievable displacement distances here are dependent on the track-helix angles and the diameters of the balls.

The outer joint part has in each case one outer crosspiece between adjacent ball tracks, as seen in a circumferential direction. The first contact surface is arranged on the outer crosspiece.

The inner joint part has in each case one inner crosspiece between adjacent ball tracks, as seen in a circumferential direction. The second contact surface is arranged on the inner crosspiece.

The inner and outer crosspieces each extend in the radial direction beyond the ball-track floor and thus form the lateral boundary of the ball track and the enclosure of the balls.

The disclosure also proposes a motor vehicle which has at least one constant-velocity slip ball joint proposed here. For example, the constant-velocity slip ball joint is proposed for use in a passenger vehicle.

It should be noted, by way of precaution, that the numerals ("first", "second", "third", etc.) used here serve primarily (only) to distinguish between multiple objects, values or processes of the same type, that is to say they do not necessarily predetermine, in particular, any dependency and/or sequence of these objects, values or processes in relation to one another. Should a dependency and/or sequence be necessary, this is explicitly specified here or it will be obvious to a person skilled in the art as he studies the embodiments specifically described.

The disclosure and the technical fields will be explained in more detail hereinbelow with reference to the figures. It should be pointed out that the disclosure is not intended to be restricted by the exemplary embodiments shown. Unless specifically presented otherwise, it is also possible for certain aspects of the subject matter explained in the figures to be extracted and combined with other constituent parts and findings from the present description and/or figures. The same reference signs denote the same objects, and this makes it possible for explanations from other figures to be used in supplementary fashion where appropriate. In the figures, schematically:

DETAILED DESCRIPTION

Figures 1, 2:
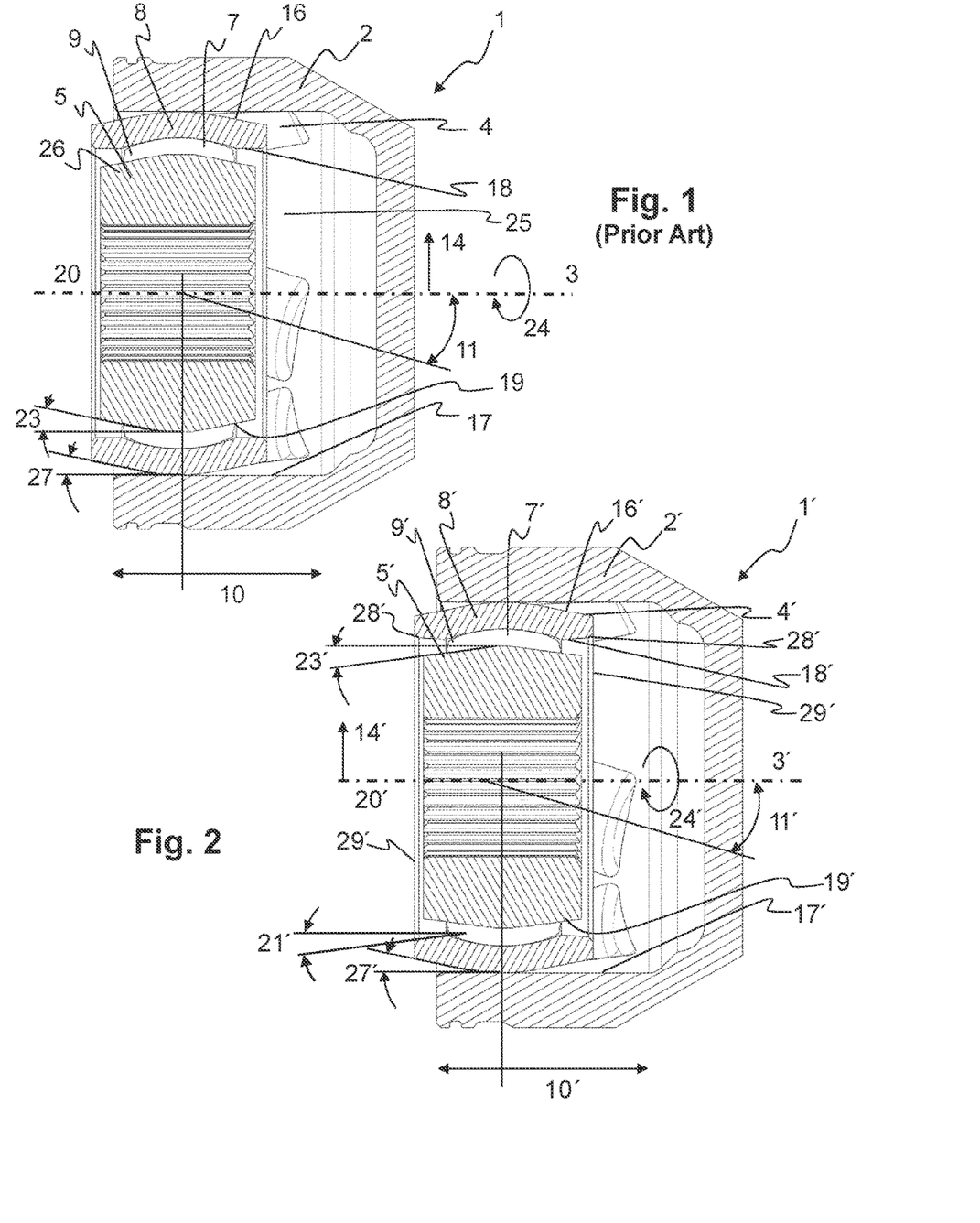
FIG. 1 shows a longitudinal section of a known constant-velocity slip ball joint in the straightened-out state.
FIG. 2 shows a longitudinal section of a constant-velocity slip ball joint in the straightened-out state.

FIG. 1 shows a longitudinal section of a known constant-velocity slip ball joint 1 in a straightened-out state. The constant-velocity slip ball joint 1 comprises an outer joint part 2 with an axis of rotation 3 and outer ball tracks 4, an inner joint part 5 with inner ball tracks 6, a plurality of torque-transmitting balls 7, each guided in associated outer and inner ball tracks 4, 6, and a cage 8, which is provided with a plurality of cage windows 9, which accommodate in each case one or more of the balls 7. The outer ball tracks 4 are spaced apart from one another by outer crosspieces 25. The inner ball tracks 6 are spaced apart from one another by inner crosspieces 26.

At least a part of the outer ball tracks 4 and at least a part of the inner ball tracks 6 are at a track-helix angle 11 in relation to the axis of rotation 3. A floor 12 of each ball track 4, 6, along the displacement distance 10, is spaced apart from the axis of rotation 3 by a respectively constant spacing 13 along a radial direction 14 (see also FIG. 10).

The inner joint part 5 can be displaced in relation to the outer joint part 2 by a displacement distance 10 along the axis of rotation 3. The achievable displacement distances 10 are dependent on the track-helix angles 11 and the diameters of the balls and can be specified only schematically in FIG. 1 and also the rest of the figures (see also FIG. 12).

Figures 3, 4:
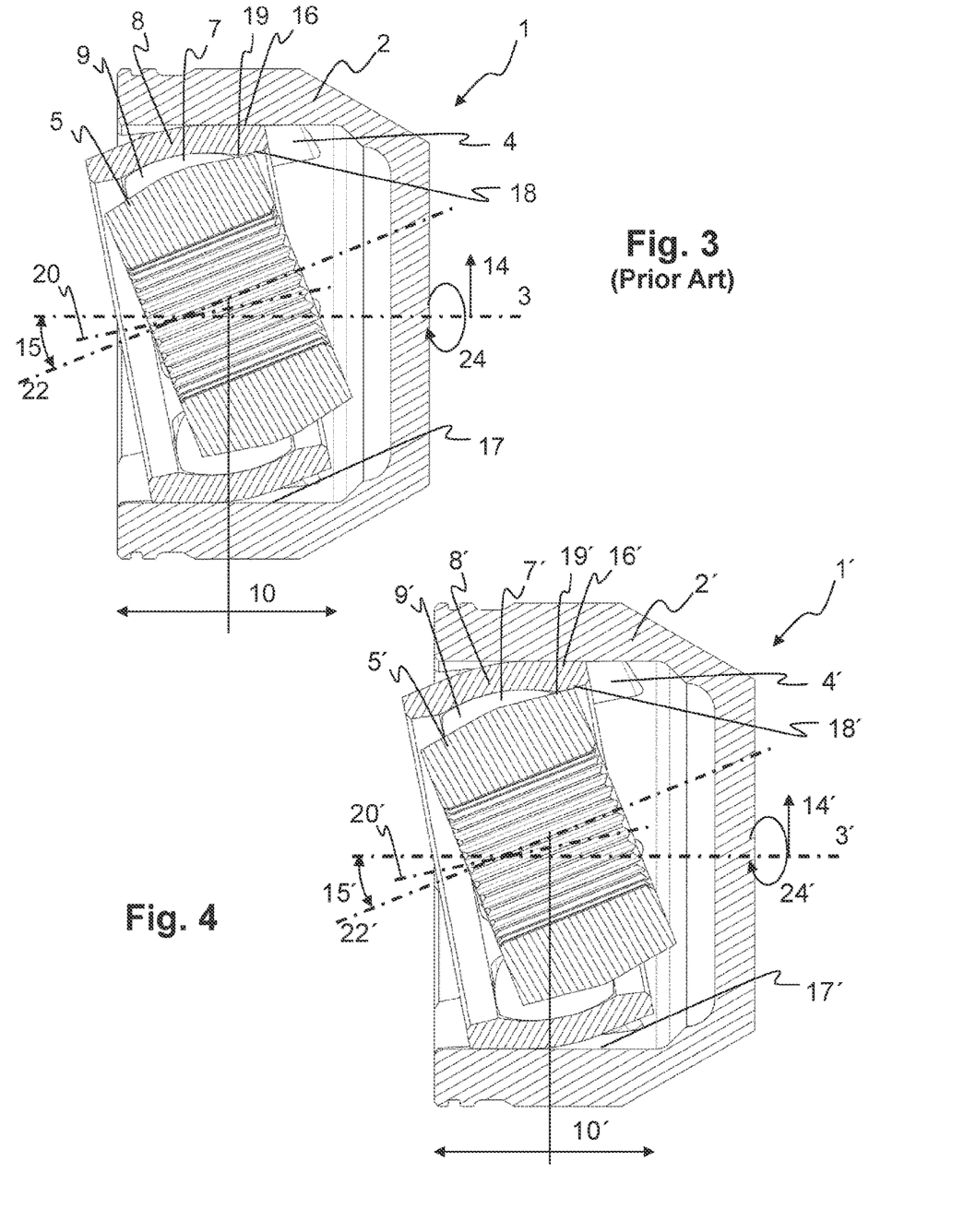
FIG. 3 shows a longitudinal section of the known constant-velocity slip ball joint according to FIG. 1 in the deflected state.
FIG. 4 shows a longitudinal section of the constant-velocity slip ball joint according to FIG. 2 in the deflected state.

In the case of the inner joint part 5 being deflected, the inner joint part 5 is pivoted out of the straightened-out position (axis of rotation 3 of the outer joint part 2 and center axis 22 of the inner joint part are arranged coaxially in relation to one another) into a deflected position (see FIG. 3). In FIG. 3, the axis of rotation 3 of the outer joint part 2 and the center axis 22 of the inner joint part are arranged at a maximum angle of deflection 15 in relation to one another. A maximum angle of deflection 15 of the inner joint part 5 in relation to the outer joint part 2 is predetermined by an outer contact surface 16 of the cage 8 establishing contact with a first contact surface 17 of the outer joint part 2. An inner contact surface 18 of the cage 8 and a second contact surface 19 of the inner joint part 5 here are spaced apart from one another (only just). As far as constant-velocity slip ball joints 1 are concerned, in the case of the joint being deflected, the cage 8 is at half the angle of deflection 15 of the inner joint part 5.

The cage 8 of the constant-velocity slip ball joint 1 according to FIG. 1 has, on the outside, a—as seen in longitudinal section—conical outer contact surface 16 with a cone angle 27 in relation to the center axis 20 of the cage and, on the inside, a cylindrical inner contact surface 18. The inner joint part 5 has likewise a conical second contact surface 19 at an angle of inclination 23 in relation to the center axis 22 of the inner joint part. The cone angle 27 of the outer contact surface 16 of the cage 8 and the angle of inclination 23 of the second contact surface 19 of the inner joint part 5 here are more or less equal in value and oriented in the same direction. The (maximum) achievable angle of deflection 15 of the inner joint part 5 in relation to the outer joint part 2 corresponds to double the value of the cone angle 27.

FIG. 2 shows a longitudinal section of a constant-velocity slip ball joint 1' in a straightened-out state. Reference is made to what has been said in relation to FIG. 1. In contrast to the known constant-velocity slip ball joint 1 according to FIG. 1, the cage 8' of the constant-velocity slip ball joint 1' has a center axis 20' and the inner contact surface 18' of the cage 8' is conical, wherein the inner contact surface 18' is at an opening angle 21' of more than zero degrees, in this case approximately 4 degrees, in relation to the center axis 20' of the cage.

As far as this constant-velocity slip ball joint 1' is concerned, the inner contact surface 18' of the cage 8', rather than being designed cylindrically (that is to say parallel to the center axis 20 of the cage 8 as in FIG. 1), is conical. This signifies a retraction of the cage edges 28' in the region of the end sides 29' of the cage 8'. The resulting reduction in the angle of inclination 23' of the second contact surface 19' of the inner joint part 5' makes it possible to increase the extent of enclosure of the balls 7' in the inner joint part 5'. The kinematics of the constant-velocity slip ball joint 1' here, however, are maintained, i.e., in the case of the inner joint part 5' being deflected in relation to the outer joint part 2' by an angle of deflection 15', it is also the case that the cage 8', with the center axis 20', is pivoted in relation to the axis of rotation 3' by half the angle of deflection 15'.

Furthermore, a cone angle 27' of the outer contact surface 16' of the cage 8' here corresponds (as in FIG. 1) to half the angle of deflection 15'.

In FIG. 2, the opening angle 21' and angle of inclination 23' have the same value. It can be seen that the opening angle 21' and angle of inclination 23' are oriented in opposite directions to one another in relation to the axis of rotation 3'.

FIG. 3 shows a longitudinal section of the known constant-velocity slip ball joint 1 according to FIG. 1 in the deflected state. Reference is made to what has been said in relation to FIG. 1. In FIG. 3, the inner joint part 5 is arranged in a state in which it has been deflected in relation to the outer joint part 2 by the maximum angle of deflection 15. A maximum angle of deflection 15 of the inner joint part 5 in relation to the outer joint part 2 is predetermined here by an outer contact surface 16 of the cage 8 establishing contact with a first contact surface 17 of the outer joint part 2. An inner contact surface 18 of the cage 8 and a second contact surface 19 of the inner joint part 5 do not establish contact with one another here. As far as constant-velocity slip ball joints 1 are concerned, in the case of the joint being deflected, the cage 8 is at half the angle of deflection 15 of the inner joint part 5.

FIG. 4 shows a longitudinal section of the constant-velocity slip ball joint 1' according to FIG. 2 in the deflected state. Reference is made to what has been said in relation to FIGS. 2 and 3.

In contrast to FIG. 3, the resulting reduction in the angle of inclination 23' of the second contact surface 19' of the inner joint part 5' makes it possible to increase the extent of enclosure of the balls 7' in the inner joint part 5'. The kinematics of the constant-velocity slip ball joint 1, however, are maintained here, i.e., in the case of the inner joint part 5' being deflected in relation to the outer joint part 2' by an angle of deflection 15', it is also the case that the cage 8', with the center axis 20', is deflected in relation to the axis of rotation 3 by half the angle of deflection 15'.

Furthermore, a cone angle 27' of the outer contact surface 16' of the cage 8' corresponds here (as in FIGS. 1 and 3) to half the angle of deflection 15'.

Figure 5:
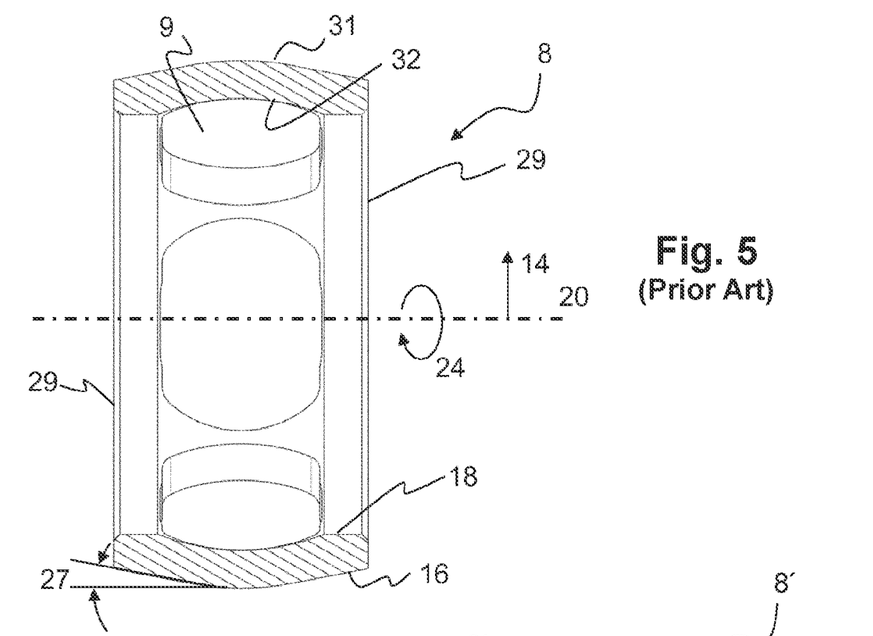
FIG. 5 shows a longitudinal section of the cage of the known constant-velocity slip ball joint according to FIG. 1 and FIG. 3.
Figure 6:
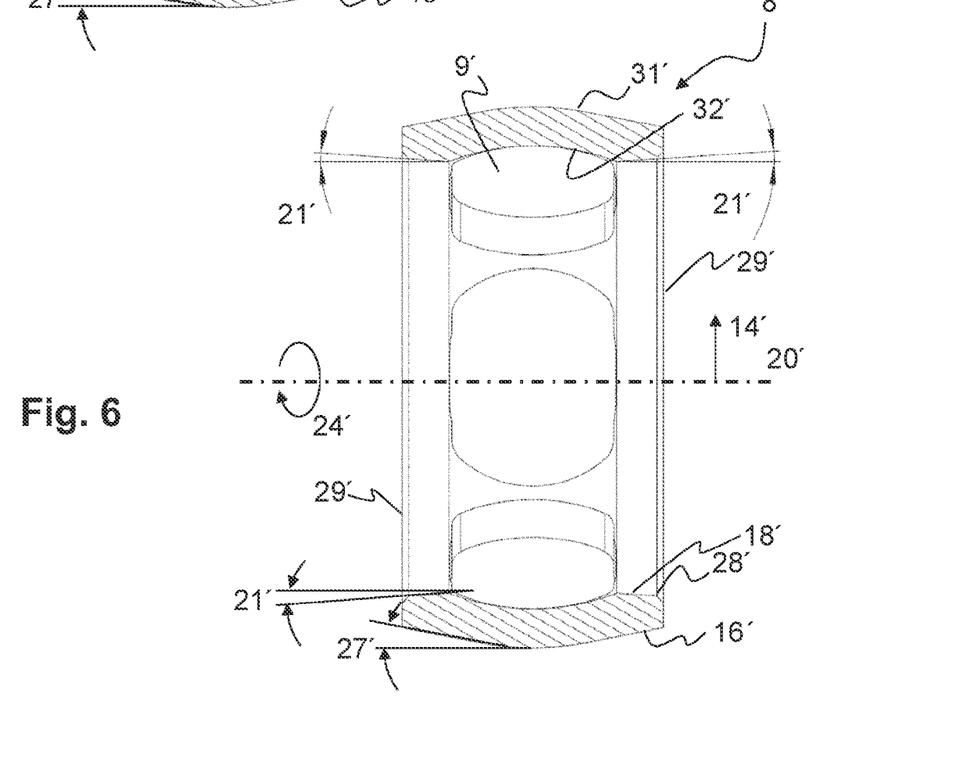
FIG. 6 shows a longitudinal section of the cage of the constant-velocity slip ball joint according to FIG. 2 and FIG. 4.

FIG. 5 shows a longitudinal section of the cage 8 of the known constant-velocity slip ball joint 1 according to FIGS. 1 and 3. FIG. 6 shows a longitudinal section of the cage 8' of the constant-velocity slip ball joint 1' according to FIGS. 2 and 4. The figures will be described, at least to some extent, together hereinbelow. The cage 8, 8' is configured such that the inner contact surface 18, 18' is designed to run all the way around in a circumferential direction 24, 24'. The inner contact surface 18, 18' is arranged on an inner circumferential surface 32, 32', and the outer contact surface 16, 16' is arranged on an outer circumferential surface 31, 31', of the cage 8, 8', wherein the contact surfaces 16, 16' and 18, 18' are each arranged (directly) adjacent to the two end sides 29, 29' of the cage 8, 8', which are oriented in the direction along the center axis 20, 20' of the cage, wherein the cage windows 9, 9' are arranged, adjacent to one another in the circumferential direction 24, between the end sides 29, 29' and the contact surfaces 16, 16' and 18, 18'.

In contrast to the known constant-velocity slip ball joint 1 having the cage according to FIG. 5, with a cylindrical inner contact surface 18, the inner contact surface 18' of the cage 8' of the constant-velocity slip ball joint 1' according to FIG. 6 is conical, wherein the inner contact surface 18' is at an opening angle 21' of more than 0 degrees, in this case approximately 4 degrees, in relation to the center axis 20' of the cage.

Figure 7:
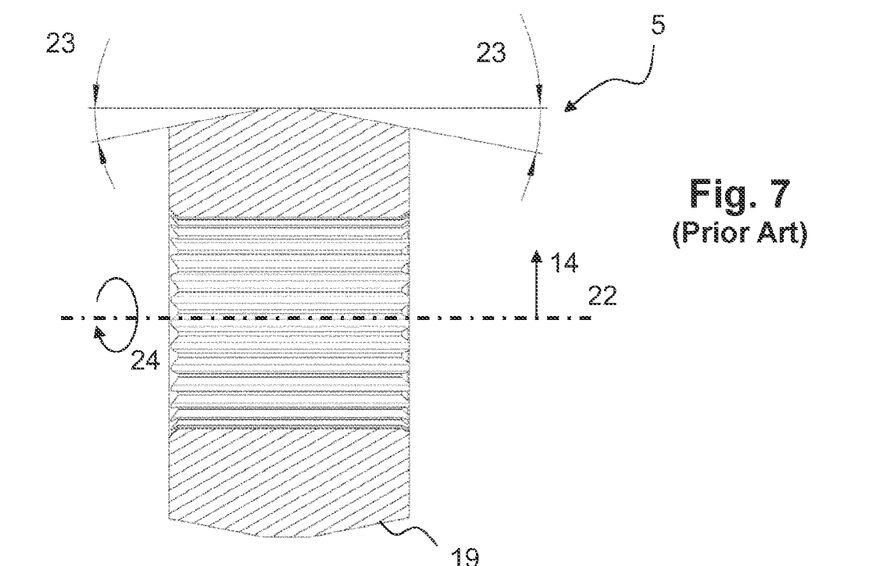
FIG. 7 shows a longitudinal section of the inner joint part of the known constant-velocity slip ball joint according to FIG. 1 and FIG. 3.
Figure 8:
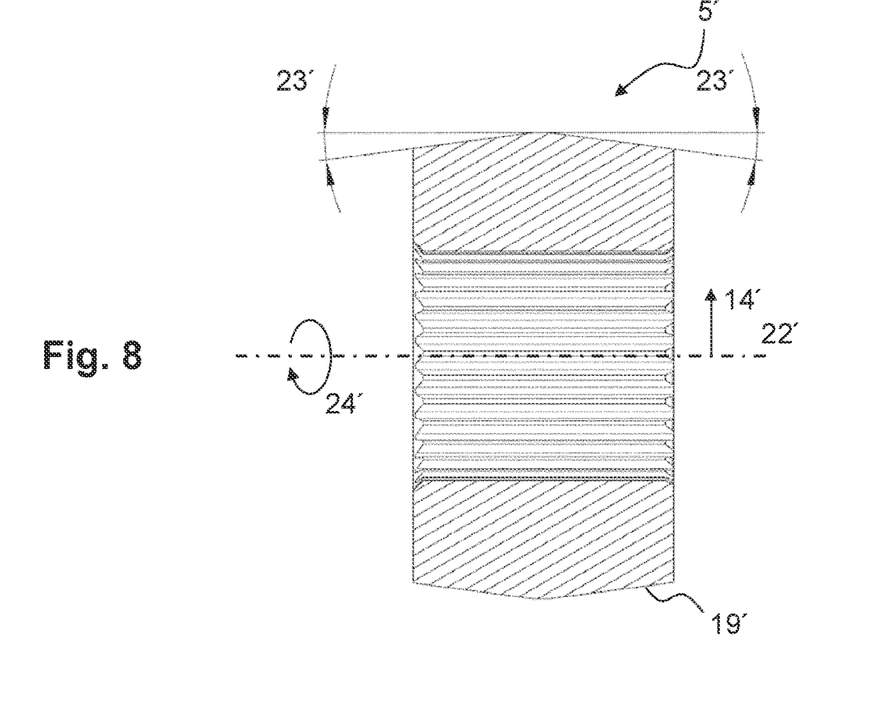
FIG. 8 shows a longitudinal section of the inner joint part of the constant-velocity slip ball joint according to FIG. 2 and FIG. 4.

FIG. 7 shows a longitudinal section of the inner joint part 5 of the known constant-velocity slip ball joint 1 according to FIGS. 1 and 3. FIG. 8 shows a longitudinal section of the inner joint part 5' of the constant-velocity slip ball joint 1' according to FIGS. 2 and 4. FIGS. 7 and 8 will be described together hereinbelow.

The inner joint parts 5, 5' each have a conical second contact surface 19, 19' at an angle of inclination 23, 23' in relation to the center axis 22, 22' of the inner joint part. It can be seen that the angle of inclination 23 of the inner joint part 5 according to FIG. 7 is considerably larger than the angle of inclination 23' of the inner joint part 5' according to FIG. 8.

Figures 9, 10:
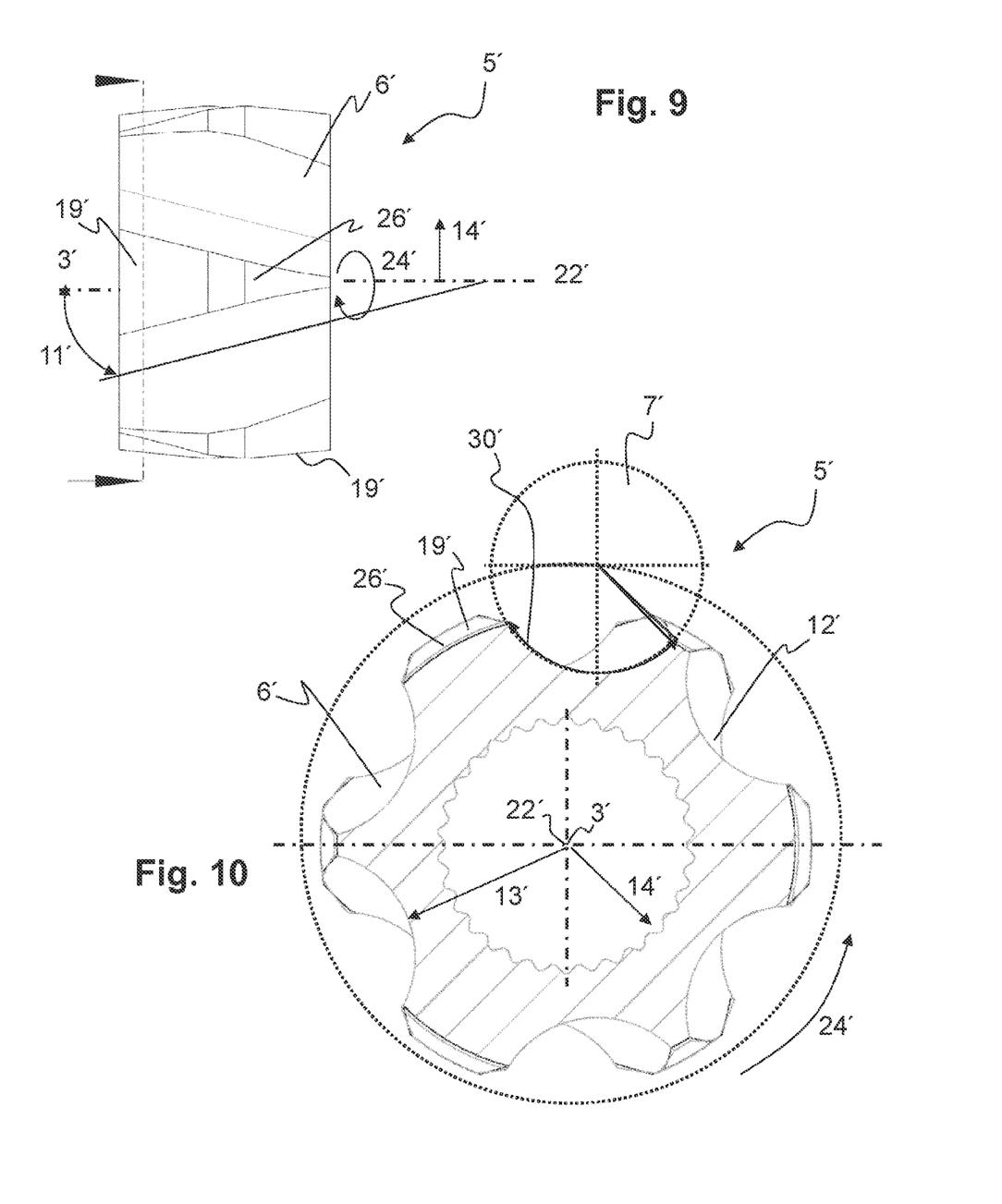
FIG. 9 shows a side view of the inner joint part according to FIG. 8.
FIG. 10 shows a cross section of the inner joint part according to FIG. 9 in a view along the center axis of the inner joint part.

FIG. 9 shows a side view of the inner joint part 5' according to FIG. 8. The inner joint part 5' has inner ball tracks 6', in each of which a respective torque-transmitting ball 7' can be arranged. At least a part of the inner ball tracks 6' is at a track-helix angle 11 in relation to the axis of rotation 3'. A floor 12' of each ball track 6', along the displacement distance 10', is spaced apart from the axis of rotation 3' by a respectively constant spacing 13' along a radial direction 14' (see also FIG. 10). The inner joint part 5' has in each case one inner crosspiece 26' between adjacent inner ball tracks 6', as seen in a circumferential direction 24'. The second contact surface 19' is arranged on the inner crosspiece 26'.

The inner crosspieces 26' each extend in the radial direction 14' beyond the ball-track floor 12 and thus form the lateral boundary of the ball track 6 and the enclosure 30 of the balls.

FIG. 9 illustrates the section plane of the illustration according to FIG. 10.

FIG. 10 shows the inner joint part 5' according to FIG. 9 in cross section (as illustrated in FIG. 9) in a view along the center axis 22' of the inner joint part. A ball 7' in an inner ball track 6' is illustrated by the dashed lines here.

The reduction in the angle of inclination 23' of the second contact surface 19' of the inner joint part 5' which is achieved by the conical design of the inner contact surface 18' of the cage 8', then, makes it possible to increase the extent of the enclosure 30' of the balls 7' in the inner joint part 5' (see greater extent of the enclosure 30' indicated). The extent of enclosure 30' is the—as seen in the circumferential direction 24'—lateral height (in the radial direction 14') of the ball tracks 6' in the inner joint part 5' along which the balls 7' are supported during operation of the joint. The increase in the extent of enclosure 30' results in it being possible for the inner joint part 5' to be subjected to higher torques. Furthermore, the fatigue strength is increased, as is therefore the expected service life of the constant-velocity slip ball joint 1'.

Figure 11:
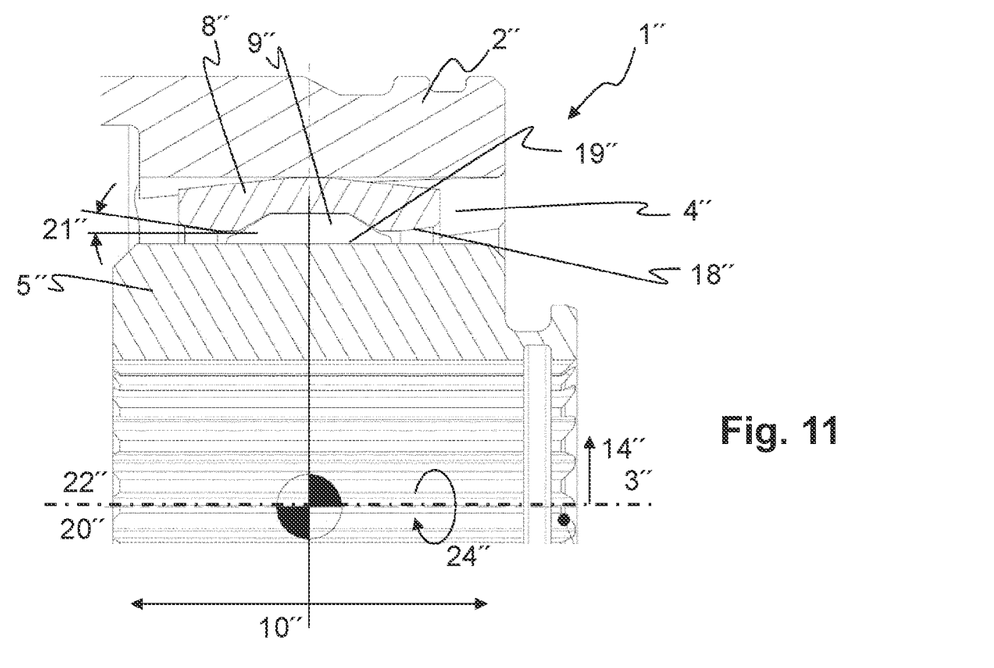
FIG. 11 shows a longitudinal section of a further constant-velocity slip ball join in the straightened-out state.

FIG. 11 shows a longitudinal section of a further constant-velocity slip ball joint 1" in the straightened-out state. Reference is made to what has been said in relation to FIG. 2. Here too, the inner contact surface 18" of the cage 8" is conical, as in FIG. 2, wherein the inner contact surface 18" is at an opening angle 21" of more than zero degrees, in this case approximately 4 degrees, in relation to the center axis 20" of the cage.

Here, in contrast to the constant-velocity slip ball joint 1' according to FIG. 2, the second contact surface 19" of the inner joint part 5" is cylindrical in relation to a center axis 22" of the inner joint part and therefore at an angle of inclination 23" of zero degrees in relation to the center axis 22" of the inner joint part. It is also the case here that the sum of the angle of inclination 23" and of the opening angle 21" is smaller than half the maximum angle of deflection 15" and smaller than the cone angle 27".

The conical inner contact surface 18" of the cage 8" therefore makes it possible for the second contact surface 19" of the inner joint part 5" to be cylindrical, in which case the angle of inclination 23 is then zero degrees.

Figure 12:
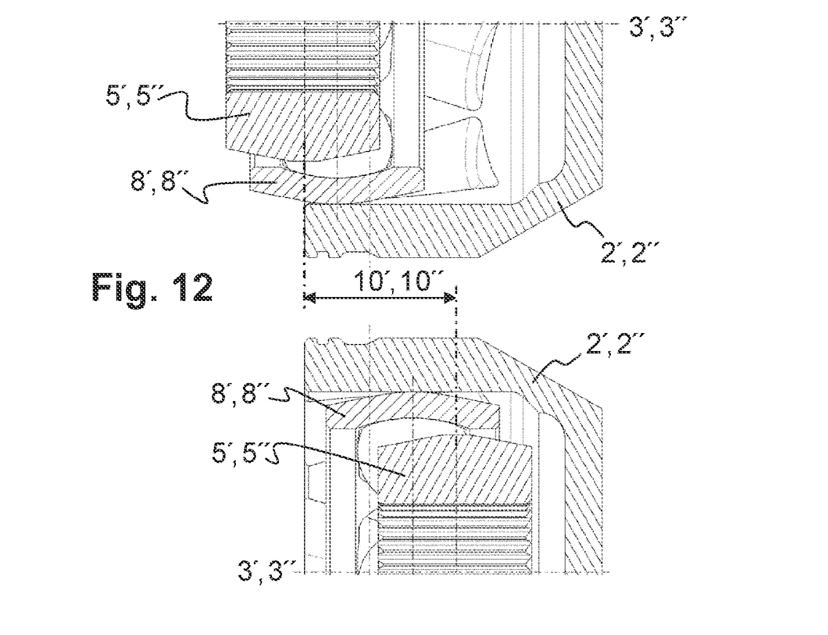
FIG. 12 shows a sectional illustration of the displacement path with reference to constant-velocity slip ball joints.

FIG. 12 shows a sectional illustration of the displacement distance 10' with reference to constant-velocity slip ball joints 1', 1". The inner joint part 5', 5" can be displaced in relation to the outer joint part 2', 2" by a displacement distance 10', 10" along the axis of rotation 3'. The achievable displacement distances 10', 10" are dependent on the track-helix angles 11', 11" and the diameters of the balls 7', 7". The inner joint part 5', 5" in the upper part of the illustration in FIG. 12 has been displaced to the maximum extent out of the outer joint part 2', 2" along the axis of rotation 3', 3". The inner joint part 5', 5" in the lower part of the illustration in FIG. 12 has been displaced to the maximum extent into the outer joint part 2', 2" along the axis of rotation 3', 3".

LIST OF REFERENCE SIGNS

1 Constant-velocity slip ball joint
2 Outer joint part
3 Axis of rotation
4 Outer ball track
5 Inner joint part
6 Inner ball track
7 Ball
8 Cage
9 Cage window
10 Displacement distance
11 Track-helix angle
12 Ball-track floor
13 Spacing
14 Radial direction
15 Angle of deflection
16 Outer contact surface
17 First contact surface
18 Inner contact surface
19 Second contact surface
20 Center axis of the cage
21 Opening angle
22 Center axis of the inner joint part
23 Angle of inclination
24 Circumferential direction
25 Outer crosspiece
26 Inner crosspiece
27 Cone angle
28 Cage edge
29 End side
30 (Extent of) enclosure
31 Outer circumferential surface
32 Inner circumferential surface

The invention claimed is:

1. A constant-velocity slip ball joint comprising:
an outer joint part defining an axis of rotation and including a plurality of outer ball tracks;
an inner joint part including a plurality of inner ball tracks and a plurality of torque-transmitting balls, each torque-transmitting ball guided in associated outer ball tracks and inner ball tracks; and
a cage, including a plurality of cage windows that each accommodate one or more of the balls;
wherein the inner joint part is displaceable in relation to the outer joint part by a displacement distance along the axis of rotation;
wherein at least a part of the outer ball tracks and at least a part of the inner ball tracks are at a track-helix angle in relation to the axis of rotation;
wherein a floor of each ball track, along the displacement path, is spaced apart from the axis of rotation by a respectively constant spacing along a radial direction;
wherein a maximum angle of deflection of the inner joint part in relation to the outer joint part is determined by an outer contact surface of the cage establishing contact with a first contact surface of the outer joint part or by an inner contact surface of the cage establishing contact with a second contact surface of the inner joint part;
wherein the cage has a center axis and the inner contact surface is conical;
wherein the inner contact surface is at an opening angle of more than zero degrees in relation to the center axis of the cage;
wherein, when the inner joint part is deflected in relation to the outer joint part by an angle of deflection, the center axis of the cage is inclined in relation to the axis of rotation by half the angle of deflection;
wherein the second contact surface of the inner joint part is cylindrical or conical in relation to a center axis of the inner joint part and is at an angle of inclination of at least 0 degrees in relation to the center axis of the inner joint part; and wherein a sum of the angle of inclination and of the opening angle is at least half the maximum angle of deflection.

2. The constant-velocity slip ball joint according to claim 1, wherein the opening angle and the angle of inclination have a same value.

3. The constant-velocity slip ball joint according to claim 1, wherein the opening angle and the angle of inclination have different values.

4. The constant-velocity slip ball joint according to claim 3, wherein the value of the opening angle is larger than that of the angle of inclination.

5. The constant-velocity slip ball joint according to claim 1, wherein the opening angle is at least four degrees.

6. The constant-velocity slip ball joint according to claim 1, wherein the inner contact surface is designed to run entirely around the cage in a circumferential direction.

7. The constant-velocity slip ball joint according to claim 1, wherein the displacement distance is at least 10 millimeters.

8. The constant-velocity slip ball joint according to claim 1, wherein the outer joint part includes, between a pair of adjacent ball tracks, an outer crosspiece, as seen in a circumferential direction;
   wherein the first contact surface is arranged on the outer crosspiece.

9. The constant-velocity slip ball joint according to claim 1, wherein the inner joint part includes, between a pair of adjacent ball tracks, an inner crosspiece, as seen in a circumferential direction;
   wherein the second contact surface is arranged on the inner crosspiece.

* * * * *